(12) United States Patent
Sato

(10) Patent No.: US 6,934,992 B2
(45) Date of Patent: Aug. 30, 2005

(54) WIPER ARM HAVING WASHER NOZZLE

(75) Inventor: Yoshimasa Sato, Inasa-gun (JP)

(73) Assignee: ASMO Co., Ltd., Shizuoka (JP)

( * ) Notice: Subject to any disclaimer, the term of this patent is extended or adjusted under 35 U.S.C. 154(b) by 405 days.

(21) Appl. No.: 10/179,228

(22) Filed: Jun. 26, 2002

(65) Prior Publication Data

US 2003/0009841 A1 Jan. 16, 2003

(30) Foreign Application Priority Data

Jul. 11, 2001 (JP) .......................... 2001-211292

(51) Int. Cl.[7] .............. B60S 1/52; B60S 1/46
(52) U.S. Cl. .............. 15/250.04; 15/250.351; 239/284.1
(58) Field of Search ............ 15/250.04, 250.351, 15/250.352, 250.01, 250.02, 250.03; 239/284.1, 284.2

(56) References Cited

U.S. PATENT DOCUMENTS

| | | | | |
|---|---|---|---|---|
| 4,133,071 A | * | 1/1979 | Jaske | ............... 15/250.04 |
| 5,239,726 A | | 8/1993 | Bianco | |
| 5,647,088 A | * | 7/1997 | Bommer et al. | ........ 15/250.201 |
| 5,724,699 A | | 3/1998 | Bexten | |
| 6,094,772 A | | 8/2000 | West | |
| 6,286,174 B1 | | 9/2001 | Zimmer | |
| 6,442,788 B1 | * | 9/2002 | Fleischer | ............... 15/250.04 |

FOREIGN PATENT DOCUMENTS

| | | | |
|---|---|---|---|
| DE | 1912037 | * | 9/1970 |
| DE | 2047079 | * | 11/1980 |
| EP | 0566470 | * | 10/1993 |
| EP | 0689977 | * | 1/1996 |
| JP | U-H06-33763 | | 5/1994 |
| WO | WO 00/47456 | | 8/2000 |

* cited by examiner

Primary Examiner—Gary K. Graham
(74) Attorney, Agent, or Firm—Posz Law Group, PLC (57) ABSTRACT

In a wiper arm, a retainer has a longitudinal base wall and side walls extending from opposite side edges of the longitudinal base wall, so that the retainer has substantially a U-shaped cross section that opens toward a wiping surface. A first washer nozzle is mounted at a substantially intermediate portion of the retainer and a second washer nozzle is mounted at an end of the retainer. The first and second washer nozzles have a first engagement portion formed with either a projection or a recessed portion. The side walls have a second engagement portion formed with the opposite of the first engagement portion. The first and second engagement portions interlock with each other, so the nozzles are secured between the side walls.

12 Claims, 8 Drawing Sheets

WIPER ARM HAVING WASHER NOZZLE

CROSS REFERENCE TO RELATED APPLICATION

This application is based on and claims the benefit of priority of Japanese Patent Application No. 2001-211292 filed on Jul. 11, 2001, the disclosure of which is incorporated herein by reference.

1. Field of the Invention

The present invention relates to a wiper arm of a wiper system for wiping a windshield of a vehicle and the like. More particularly, the present invention relates to a wiper arm having a washer nozzle for spraying washer liquid to a windshield.

2. Background of the Invention

In a wiper system of a vehicle, it is known to mount a washer nozzle on a wiper arm to shorten a distance between the washer nozzle and a surface to wipe, thereby spraying washer liquid properly to the surface. This wiper arm is, for example, disclosed in JP-U-6-33763.

In this kind of wiper arm, however, the washer nozzle is fixed to an arm piece by welding or with screws. Also, additional parts such as clamps are required to fix the washer nozzle. Further, in a case where the washer nozzle protrudes from the wiper arm or the arm piece toward the surface to wipe, not only is appearance poor, but also the washer nozzle is likely to be damaged by snow and ice deposited on the surface to wipe.

SUMMARY OF THE INVENTION

It is an object of the present invention to provide a wiper arm with enhanced appearance and to decrease damage to a washer nozzle during wiper arm use.

According to an aspect of the present invention, a wiper arm has a longitudinal body having a longitudinal base wall and a pair of side walls extending from opposite longitudinal edges of the base wall, so that the longitudinal body has a substantially U-shaped cross-section opening toward a wiping surface. A washer nozzle is mounted on the longitudinal body. A delivery pipe extends along the longitudinal body and connects to the washer nozzle. The washer nozzle has a first engagement portion that is formed with one of a projection and a recessed portion. The pair of side walls has a second engagement portion that is formed with the other of the first engagement portion. The first engagement portion and second engagement portion interlock with each other.

According to this, the washer nozzle is held between the side walls by interlocking the first engagement portion with the second engagement portion. Therefore, additional parts are not required to fix the washer nozzle, thereby easing installation. Since the washer nozzle is held between the side walls, damage, due to collisions with snow ice and the like is decreased and outside appearance is enhanced. In addition, because the first and second engagement portions are provided at the predetermined positions, it becomes easy to properly position the washer nozzle between the side walls.

Alternatively, the washer nozzle is tightly fitted and held between the side walls. Therefore, additional parts are not required to fix the washer nozzle. Further, outside appearance is enhanced and damage due to collisions with snow, ice and the like is decreased.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1:
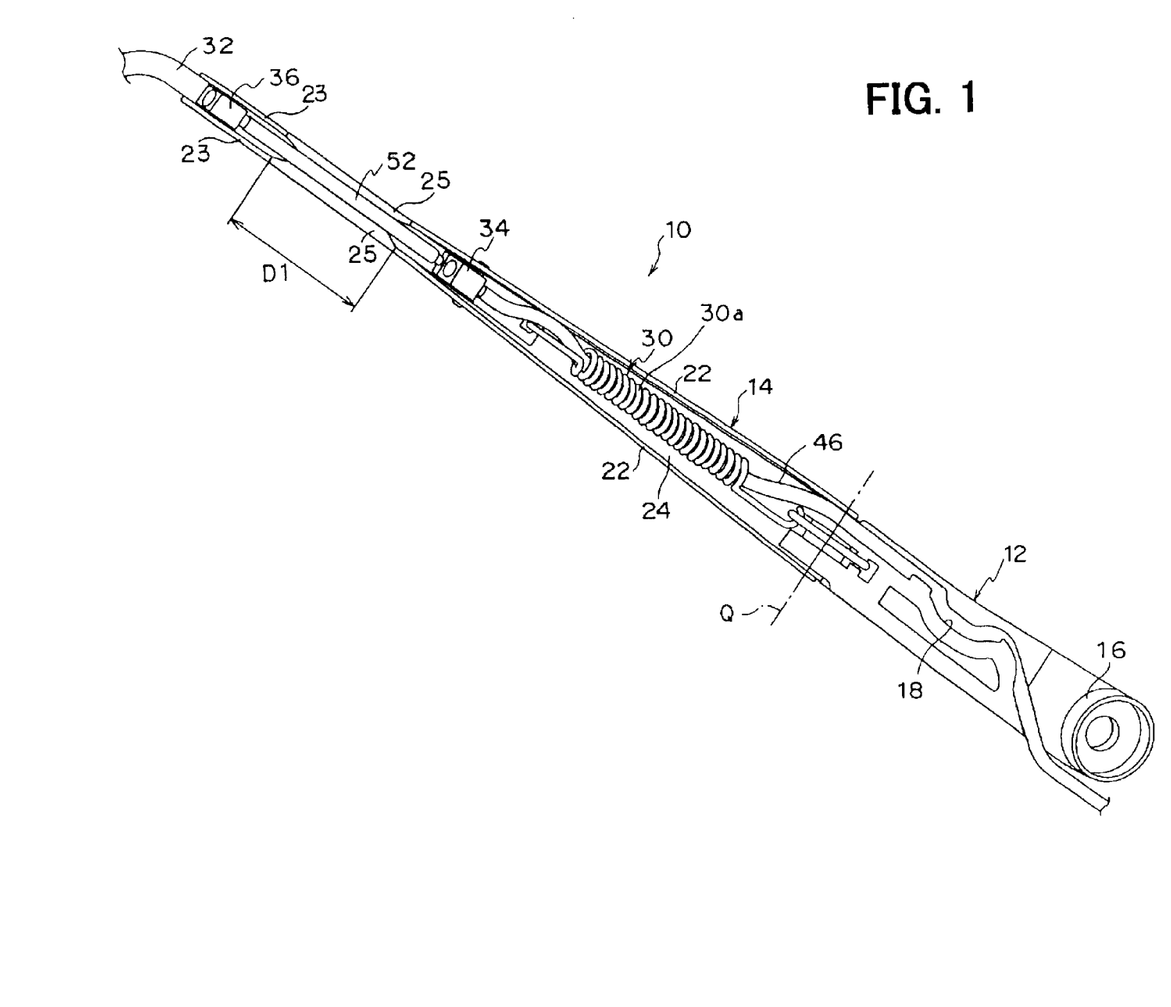
FIG. 1 is a schematic diagram of a rear side of a wiper arm according to the first embodiment of the present invention.
Figure 2:
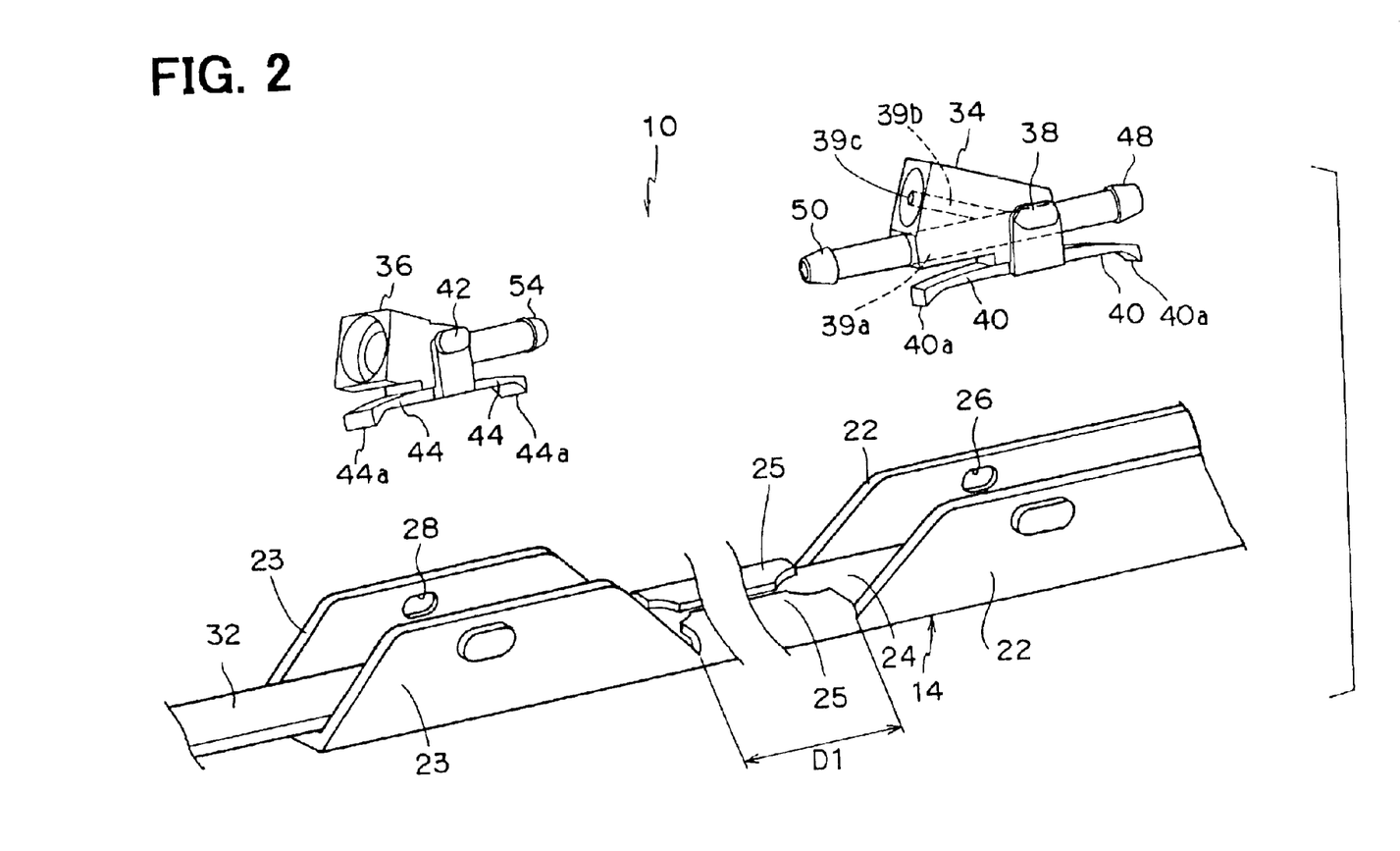
FIG. 2 is a perspective view of a main part of the wiper arm according to the first embodiment of the present invention.

FIG. 1 is a schematic diagram of a rear side of a wiper arm 10. FIG. 2 is a perspective view of a main part of the wiper arm 10. Referring to FIG. 1, the wiper arm 10 has an arm head 12, a retainer 14 and an arm piece 32. An end of the arm head 12 is fixed to a pivot shaft (not shown) provided on a vehicle as a rotation shaft so that the wiper arm 10 rotates with the pivot shaft. A skirt portion 16 is formed on the end of the rear side surface of the arm head 12 to surround the pivot shaft. An aperture 18 having a wave or curving shape is formed substantially in the middle of the rear side surface of the arm head 12 along a longitudinal direction of the arm head 12. The aperture 18 is to extend a delivery hose 46 (described later).

The retainer 14 is connected to the front side of arm head 12 to rotate about an axis Q within a predetermined rotation angle toward and apart from a windshield. The retainer 14 has a longitudinally extending base wall 24 and a pair of side walls extending from longitudinal edges of the base walls 24. The retainer 14 has a substantially U-shaped cavity in cross section opening toward a wiping surface of the windshield. Portions of the side walls are folded inwardly toward the base wall 24 so that the pair of side walls is divided into two pairs of side walls 22, and 23 (first side walls 22 and second side walls 23). The second side walls 23 are separated from the first side walls 22 by a distance D1 in the longitudinal direction of the retainer 14 and located at substantially the distal end of the retainer 14. The folded portions between the first side walls 22 and the second side walls 23 provides holding portions 25 to hold the end of the arm piece 32.

A first washer nozzle 34 is mounted between the first side walls 22 at substantially an intermediate portion of the retainer 14 in the longitudinal direction. A second washer nozzle 36 is mounted between the second side walls 23 at what is practically the distal end of the retainer 14. Recessed portions 26 and 28 are formed on the inner surfaces of the first and second side walls 22 and 23, respectively. Each of the recessed portions 26 and 28 is substantially oval (elliptical) in cross section.

A spring (extension coil spring) 30 is provided between the retainer 14 and the arm head 12. A coil portion 30a of the spring 30 is disposed within the cavity of the retainer 14 and urges the retainer 14 against the wiping surface of the windshield.

The arm piece 32 is joined with the retainer 14. The end of the arm piece 32 is tightly held at the holding portions 25 or fixed with a rivet. The other side end of the arm piece 32 is curved into substantially a U-shape to form a hook (not shown) and supports a wiper blade through a clip (not shown).

Referring to FIG. 2, the first washer nozzle 34 has projections 38 on its side surfaces. The projections 38 have a substantially oval (elliptical) shape to fit in the recessed portion 26 of the first side walls 22. The first washer nozzle 34 is held between the first side walls 22 by fitting the projections 38 in the recessed portions 26. Since the projections 38 and recessed portions 26 are oval in shape and interlock with each other, the first washer nozzle 34 is restricted from rotating with respect to the retainer 14.

Further, the first washer nozzle 34 has a pair of resilient pieces 40 on its bottom which faces the base wall 24, as a first resilient pressing part. The pair of resilient pieces 40 extends opposite to each other with respect to the projections 38, in the longitudinal direction of the base wall 24. Each of the resilient pieces 40 press-contacts with the inner surface of the base wall 24 in a resilient pressing state. More specifically, each of the resilient pieces 40 resiliently presses the inner surface of the base wall 24 in an opposite rotational direction to each other with respect to an axis of fitting portions (engagement portions) of the projections 38 and the recessed portion 26. This supplies opposing rotational forces about the projections 38 and recessed portions 26.

The first washer nozzle 34 has an inlet nipple 48 and an outlet nipple 50. A communication pipe 39a is formed in the first washer nozzle 34 to permit communication between the inlet nipple 48 and the outlet nipple 50. A side pipe 39b is formed to diverge from the communication pipe 39a in substantially a Y-shape. A spray orifice 39c of the first washer nozzle 34 is formed at the distal end of the side pipe 39b.

Similar to the first washer nozzle 34, the second washer nozzle 36 has projections 42 having a substantially oval (elliptical) shape on its side surfaces to fit in the recessed portions 28. The second washer nozzle 36 is held between the second side walls 23 in such a manner that the projections 28 fit in the recessed portions 28, so the second washer nozzle 36 is restricted from rotating with respect to the retainer 14. Further, the second washer nozzle 36 has a pair of resilient pieces 44 on its bottom which faces the base wall 24, as the first resilient pressing part. The pair of resilient pieces 44 extends opposite to each other with respect to the projections 42 and press-contact with the inner surface of the base wall 24 in the resilient pressing state. More specifically, each of the resilient pieces 44 presses the inner surface of the base wall 24 in an opposite rotational direction to each other with respect to the axis of the fitting portions of the projections 42 and the recessed portion 28. This supplies opposing rotational forces about the projections 42 and recessed portions 28. The second washer nozzle 36 has an inlet nipple 54.

An end of a delivery pipe 46 is connected to the first washer nozzle 34. The other end of the delivery pipe 46 is connected to a washer tank (not shown) mounted on a vehicle through a washer pump (not shown). The delivery pipe 46 is pulled out of the vehicle from a pipe outlet (not shown) provided on a body of the vehicle near the pivot shaft. The delivery pipe 46 is further extended along the rear side of the arm head 12, held in the aperture 18 and aligned between the first side walls 22. The delivery pipe 46 is further passed through an open central portion of the coil portion 30a of the spring 30 toward the retainer 14 and connected to the inlet nipple 48 of the first washer nozzle 34. The outlet nipple 50 of the first washer nozzle 34 and the inlet nipple 54 of the second washer nozzle 36 are connected with an auxiliary pipe 52. Washer liquid is delivered to the first washer nozzle 34 through the delivery pipe 46 and further delivered to the second washer nozzle 36 through the auxiliary pipe 52. The washer liquid is sprayed out from the spray orifices provided on the first and the second washer nozzles 34 and 36.

In a wiper system having the above described wiper arm 10, the wiper arm 10 reciprocates with the rotation of the pivot shaft, so the wiper blade supported by the wiper arm 10 wipes rainwater, snow, sleet and the like from the windshield. Since the wiper arm 10 has the first washer nozzle 34 and the second washer nozzle 36, even if the wiped area is enlarged, washer liquid sprayed out from the first and second washer nozzles 34 and 36 properly reaches a target wiping area.

The first and second washer nozzles 34 and 36 are disposed between the first and second side walls 22 and 23 of the retainer 14 which has substantially a U-shaped cross section opening toward the wiping surface. The first and second washer nozzles 34 and 36 are secured by fitting the projections 38 and 42 in the recessed portions 26 and 28, respectively. Therefore, the first and second washer nozzles 34 and 36 can be easily installed in the retainer 14 without requiring additional parts. Further, since the first and second washer nozzles 34 and 36 are installed inside the cavity of the retainer 14, outside appearance is enhanced. Further, damage due to external forces such as collisions with snow and ice can be decreased.

Since the first and second washer nozzles 34 and 36 are held in such a manner that the projections 38 and 42 engage with the recessed portions 26 and 28, respectively, the first and second washer nozzles 34 and 36 are properly positioned during the installation.

The projections 38 and 42 and the recessed portions 26 and 28 are formed into substantially oval (elliptical) shapes, that is, a noncircular shape or a non-annular shape in cross section when it is taken along the longitudinal direction of the base wall 24. Therefore, the first and second washer nozzles 34 and 36 are restricted from rotating with respect to the retainer 14. Accordingly, displacements of spraying directions of spray orifices of the first and second washer nozzles 34 and 36 are restricted. As a result, it is unlikely that the washer liquid will be sprayed at a location other than what is intended even during periods of vibrations and the like.

The first washer nozzle 34 has the pair of resilient pieces 40 that contact with the inner surface of the base wall 24 of the retainer 14 in the resilient pressing state. Similar to this, the second washer nozzle 36 has the pair of resilient pieces 44. The resilient pieces 40 and 44 have projections 40*a* and 44*a* at the ends, respectively. The projections 40*a* and 44*a* project toward the base wall 24 from the resilient pieces 40 and 44, respectively. When the first and second washer nozzles 34 and 36 are installed between the first and second side walls 22 and 23, respectively, the projections 40*a* and 44*a* press-contact with the inner surface of the base wall 24. When the washer nozzles 34 and 36 are further pressed against the inner surface of the base wall 24, the resilient pieces 40 and 44 become warped and the projections 38 and 42 fit in the recessed portions 26 and 28, respectively.

At this time, even if a rotational force is subjected to the first washer nozzle 34 about the fitting portion of the projections 38 and the recessed portions 26, the rotational force is balanced by the pair of resilient pieces 40. The pair of resilient pieces 40 exhibits resilient forces opposite to each other with respect to the fitting portion. Therefore, the first washer nozzle 34 is restricted from rotating about its fitting portion, and will not vibrate against the retainer 14 in a direction substantially perpendicular to the surface of the base wall 24. Similarly, even if a rotational force is subjected to the second washer nozzle 36 about the fitting portion of the projections 28 and the recessed portions 42, the force is balanced by the resilient pieces 44. The pair of resilient pieces 44 exhibits resilient forces opposite to each other with respect to the fitting portion. Therefore, the second washer nozzle 36 is restricted from rotating about the fitting portion and vibrating against the base wall 24 of the retainer 14.

In addition, if the distance D1 is long and the side walls exist between the first and the second side walls, wind noise is generated due to Kármán swirling flow when the vehicle moves. However, in this embodiment, the side walls are partly folded toward the base wall 24 between the first and the second side walls 22 and 23 and provide the holding portions 25. That is, the side walls do not exist between the first and the second side walls 22 and 23, thereby decreasing wind noise.

Accordingly, appearance or design of the wiper arm 10 is enhanced. Further, damage to the first and second washer nozzles 34 and 36 installed inside the retainer 14 is decreased.

Figure 3:
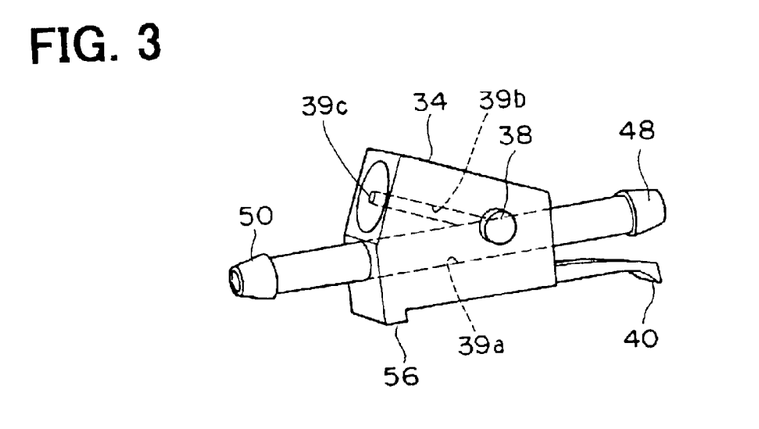
FIG. 3 is a perspective view of an example of a first washer nozzle according to the first embodiment of the present invention.

Referring to FIGS. 1 and 3, it is possible to eliminate each one of the resilient pieces 40 and 44 from the first and second washer nozzles 34 and 36 and provide projections 56. That is, the first washer nozzle 34 has one resilient piece 40 and a projection 56, for example. In these cases, the first and second washer nozzles 34 and 36 are installed in such a manner that the resilient pieces 40 and 44, and the projections 56 press-contact with the inner surface of the base wall 24. Therefore, the washer nozzles 34 and 36 are installed in the retainer 14 without rotating about the fitting portions and vibrating against the retainer 14.

Further, the projections 38 are formed on the first washer nozzle 34 and the recessed portions 26 are formed on the first side walls 22 of the retainer 14. However, the projections 38 can be formed on the first side walls 22 and the recessed portions 26 can be formed in the first washer nozzle 34. Similarly, the projections 42 can be formed on the second side walls 23 and the recessed portions 28 can be formed in the second washer nozzle 36.

Next, other modifications of the present invention will be described hereinafter. Structural portions that are substantially the same as those of prior embodiments are denoted by like reference symbols, so explanations of those portions will not be repeated.

(Second Embodiment)

Figure 4:
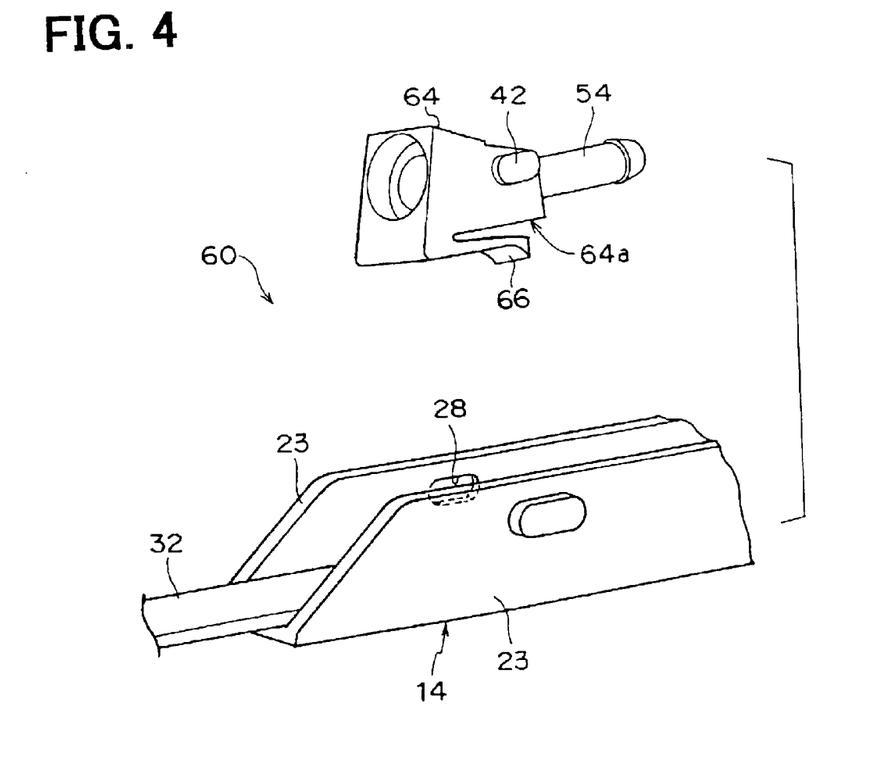
FIG. 4 is a perspective view of a main part of a wiper arm according to the second embodiment of the present invention.

Referring to FIG. 4, in a wiper arm 60 of the second embodiment, a second washer nozzle 64 mounted at the distal end of the retainer 14 has a resilient piece 66 on its bottom side facing the base wall 24, as the first resilient pressing part. The resilient piece 66 extends from one end of the second washer nozzle 64 and is substantially parallel to the bottom surface 64*a* of the second washer nozzle 64 and forms substantially a U-shape with itself and the bottom surface 64*a* of the washer nozzle 64. The resilient piece 66 contacts the inner surface of the base wall 24 in a resiliently pressing state. Here, because the first washer nozzle can have a resilient piece having a structure similar to the resilient piece 66, description and illustration of the first washer nozzle are omitted.

Also in the wiper arm 60, the first washer nozzle and the second washer nozzle 64 obtain advantages similar to those of the first embodiment. In addition, since the washer nozzle 64 has the single resilient piece 66 and it resiliently contacts with the inner surface of the base wall 24, it is possible to make the washer nozzles smaller while restricting vibration of the washer nozzle 64 against the retainer 14*d*. Also, this washer nozzle 64 may be suitable for installation in a small or limited space.

(Third Embodiment)

Figure 5:
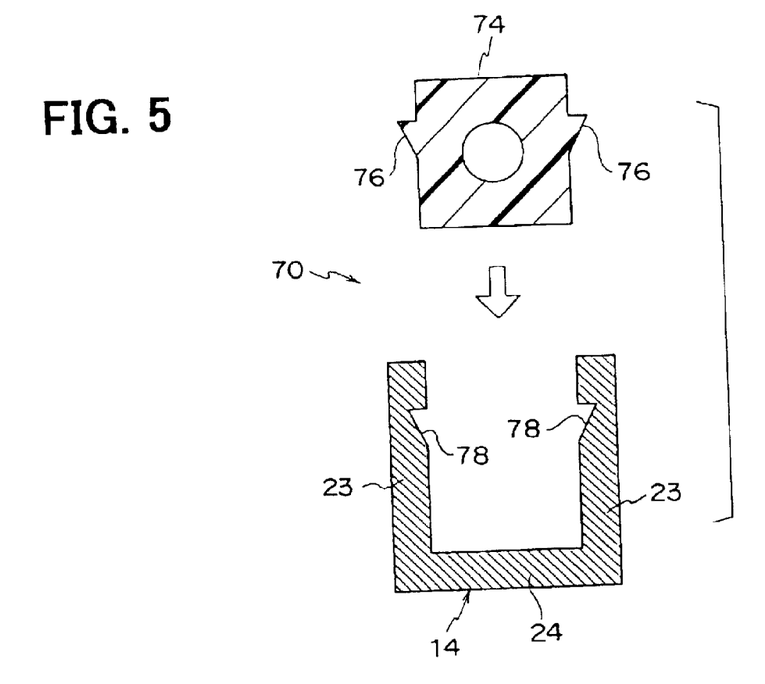
FIG. 5 is a cross-sectional view of a main part of a wiper arm according to the third embodiment of the present invention.

Referring to FIG. 5, in a wiper arm 70 of the third embodiment, a second washer nozzle 74 installed at the distal end of the retainer 14 has projections 76 on its side surfaces. The projections 76 have a wedge shape in cross-section taken substantially perpendicular to the longitudinal direction of the retainer 14. The projections 76 fit in recessed portions 78 formed on inner surfaces of the second side walls 23, as shown by the arrow in FIG. 5. Here, the recessed portions 78 have a wedge-shaped cross-section to fit with the projections 76. The second washer nozzle 74 is held between the pair of second side walls 23 by fitting the projections 76 into the recessed portions 78, so the second washer nozzle 78 is restricted from rotating against the retainer 14. The first washer nozzle installed at the substantially intermediate position of the retainer 14 has a structure similar to the second washer nozzle 74. Thus, the description and illustration of the first washer nozzle are omitted.

In the wiper arm 70 of the third embodiment, the first washer nozzle and the second washer nozzle 74 obtain advantages similar to those of the first embodiment. In addition, the projections 76 and the recessed portions 78 have a wedge shape in cross section to engage with each other. Therefore, when the first washer nozzle or the second washer nozzle 74 is installed in the cavity of the retainer 14 from its open side, the projections 76 gradually bend the side walls 22 or 23 outward. The washer nozzles are easily installed between the side walls 22 and 23 without being caught by the side walls 22 and 23, thereby easing the installation.

Figure 6:
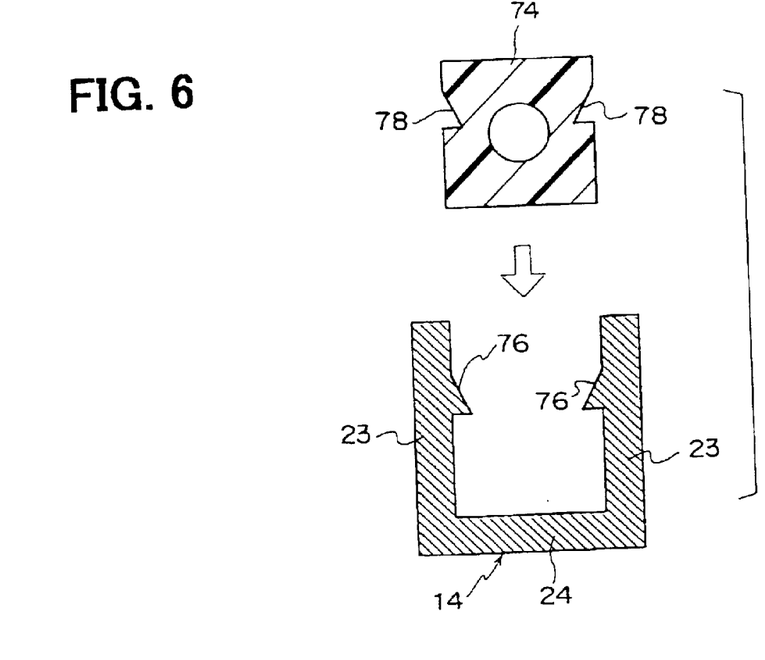
FIG. 6 is a cross-sectional view of the main part of the wiper arm, as another example of the third embodiment of the present invention.

In the third embodiment, the projections 76 are formed on the second washer nozzle 74 and the recessed portions 78 are formed on the second side walls 23. However, the recessed portions 78 can be formed on the second washer nozzle 74 and the projections 76 can be formed on the second side walls 23, as shown in FIG. 6.

(Fourth Embodiment)

Figure 7:
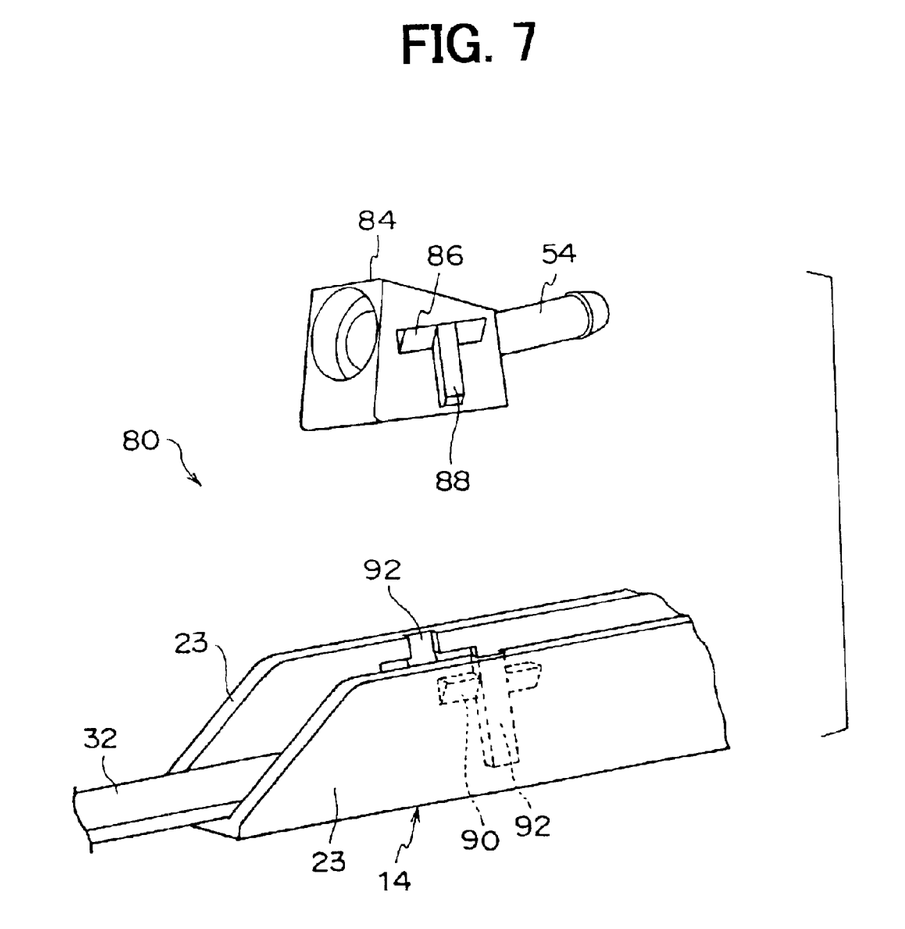
FIG. 7 is a perspective view of a main part of a wiper arm according to the fourth embodiment of the present invention.

Referring to FIG. 7, in a wiper arm 80 of the fourth embodiment, a second washer nozzle 84 has wedge projections 86 and guide projections 88 on its side surfaces. The wedge projections 86 have the wedge shape in cross section, similar to the projection 76 of the third embodiment. The guide projections 88 are provided to cross with the projections 86 to form substantially a T-shape with the wedge projections 86. The second side walls 23 have recessed portions 90 having wedge-shaped cross sections to receive the wedge projections 86 near the edges of the second side walls 23. Further, the guide grooves 92 are formed on the inner surfaces of the second side walls 23 to receive the guide projections 88. The guide grooves 92 are continuous from the edges of the side walls 23 and crossed with the recessed portions 90, respectively. The guide grooves 92 are formed along an installation direction of the second washer nozzle 84.

The second washer nozzle 84 is installed between the second side walls 23 in such a manner that the guide projections 88 are inserted from the open end of the guide grooves 92 while being guided by the guiding grooves 92 and the projections 86 then fit in the recessed portions 90, respectively. Since the projections 86 fit in the recessed portions 92, the second washer nozzle 84 is restricted from rotating against the retainer 14.

Here, the first washer nozzle can have a structure similar to the second washer nozzle 84. Thus, the description and illustration of the first washer nozzle are omitted.

Also in the wiper arm 80, the first washer nozzle and the second washer nozzle 84 are installed between the first and second side walls 22 and 23 by fitting the projections 86 in the recessed portions 90. Therefore, additional parts are not required to install the first washer nozzle and the second washer nozzle 84. Especially in this case, the first washer nozzle and the second washer nozzle 84 are installed in such a manner that the guide projections 88 are inserted from the open end of the guide grooves 92 while being guided by the guide grooves 92, thereby facilitating installation of the washer nozzles. Further, since the wedge projections 86 and the guide projections 88 are in substantially a T-shape, and interlock with the recessed portions 90 and the guide grooves 92, rotation or displacement of the washer nozzle 84 can be effectively prevented.

Also in the fourth embodiment, the recessed portions 90 and guide grooves 92 can be formed on the first and the second washer nozzle and the projections 86 and the guide projection 88 can be formed on the first and the second side walls 22 and 23 of the retainer 14.

Figure 8:
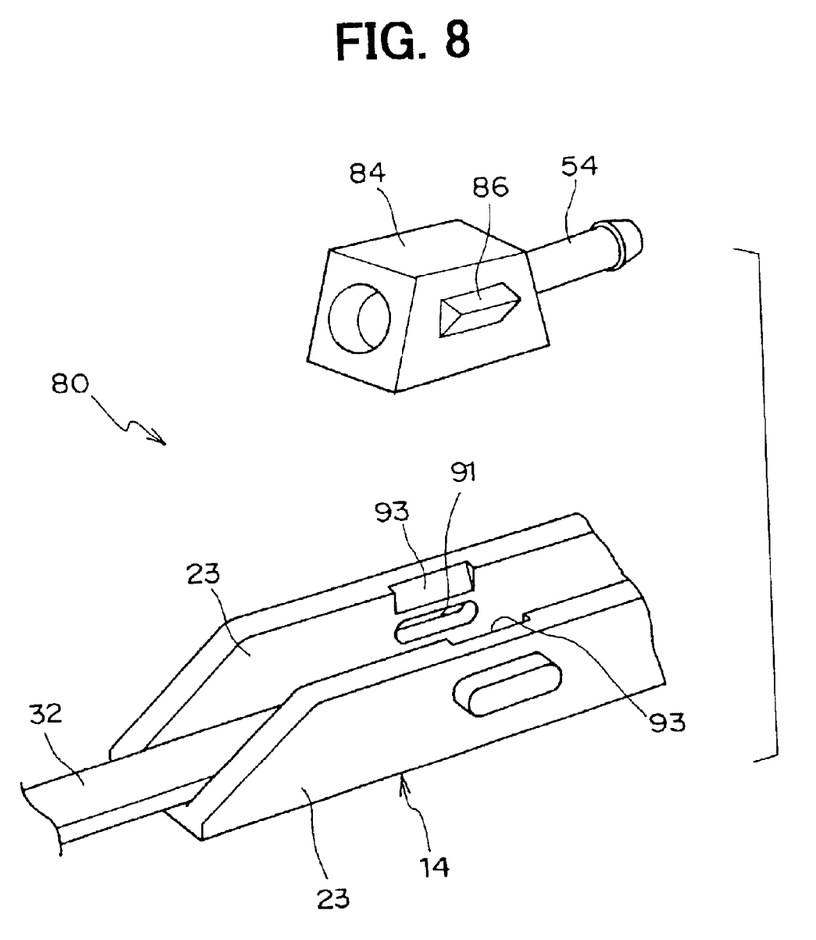
FIG. 8 is a perspective view of the main part of the wiper arm, as another example of the fourth embodiment of the present invention.

Although the guide projection 88 and the guide groove 92 are provided to cross with the projections 86 and the recessed portions 90, respectively, the recessed portions 90 can be formed separately from the guiding grooves 92. For example, as shown in FIG. 8, the second washer nozzle 84 has the wedge projections 86 and the recessed portions 91. Guide slopes 93 are formed on the edges of the second side walls 23 adjacent to the recessed portions 91. The widths of the guide slopes 93 in the longitudinal direction of the retainer 14 are substantially the same as those of the projections 86 and the recessed portions 91. Also in this case, the projections 86 are installed in the recessed portions 91 by being guided with the guide slope 93, thereby further facilitating installation.

(Fifth Embodiment)

Figure 9:
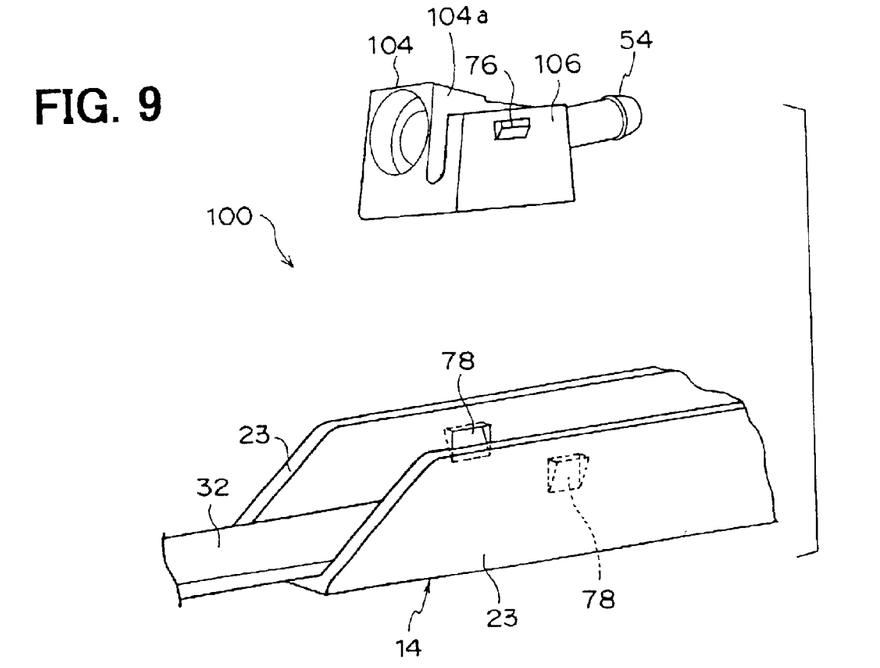
FIG. 9 is a perspective view of a main part of a wiper arm according to the fifth embodiment of the present invention.
Figure 10:
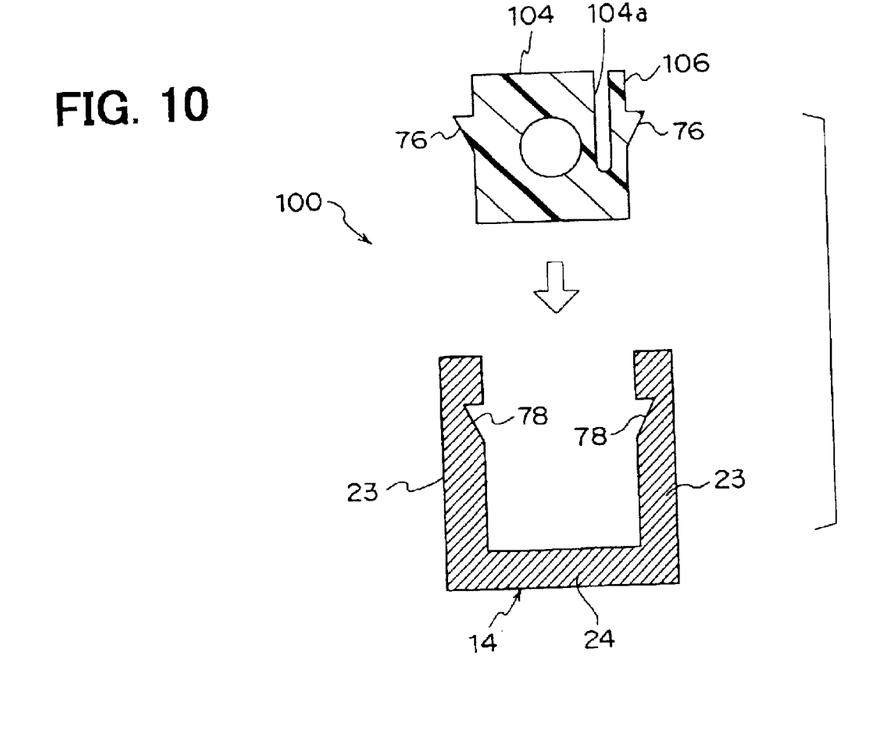
FIG. 10 is a cross-sectional view of the wiper arm according to the fifth embodiment of the present invention.

Referring to FIG. 9, in a wiper arm 100 of the fifth embodiment, a second washer nozzle 104, which is disposed at the distal end of the retainer 14, has a resilient piece 106 as a second resilient pressing part. The resilient piece 106 is formed on one of the side surfaces 104a. The resilient piece 106 extends from the bottom portion of the second washer nozzle 104 substantially parallel to the side surface 104a. The resilient piece 106 forms substantially a U-shape with itself and the side surface 104a of the washer nozzle 104, as shown in FIGS. 9 and 10. The resilient piece 106 contacts with one of the second side walls 23 in the resilient pressing state. The projection 76 is formed on the side surface of the resilient piece 106. The projection 76 is also formed on the surface opposite the resilient piece 106 on the washer nozzle 104. The projections 76 fit in the recessed portions 78 formed on the second side walls 23 of the retainer 14. The first washer nozzle can have a structure similar to the second washer nozzle 104. Thus, description and illustration of the first washer nozzle are omitted.

Also in the wiper arm 100, advantages similar to the first and third embodiments are obtained. In a case that the first washer nozzle and the second washer nozzle 104 are made of resin, size errors are caused on the washer nozzles due to sink marks caused during hardening of the resin. With the size errors, the washer nozzles are likely to vibrate between the first and second side walls 22 and 23 after installation. However, in the wiper arm 100 of the fifth embodiment, the resilient piece 106 is provided on the first washer nozzle and the second washer nozzle 104. The resilient piece 106 press-contacts with each one of the side walls 22 and 23. Therefore, even if the washer nozzles have size errors, the vibration of the washer nozzles between the first and second side walls 22 and 23 are restricted without requiring additional parts.

Although the resilient piece 106 is provided on one side of each washer nozzle, the resilient pieces 106 can be provided on both sides of each washer nozzle to resiliently contact with both the first side walls 22 and both the second side walls 23.

Figure 11:
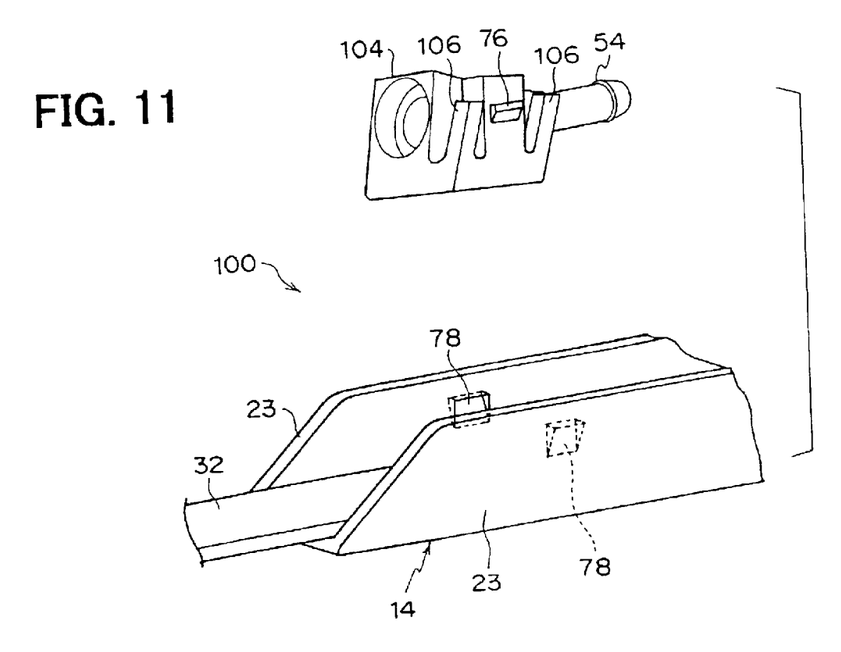
FIG. 11 is a perspective view of the wiper arm, as another example of the fifth embodiment of the present invention.

Further, the projections 76 are formed on the resilient piece 106 and the side surface of the washer nozzle 104. However, as shown in FIG. 11, the projections 76 can be separately provided on the washer nozzle 104 from the resilient pieces 106. Also in this case, because the resilient pieces 106 resiliently contact the side walls 22 and 23, the vibration of the washer nozzles can be prevented.

(Sixth Embodiment)

Figure 12:
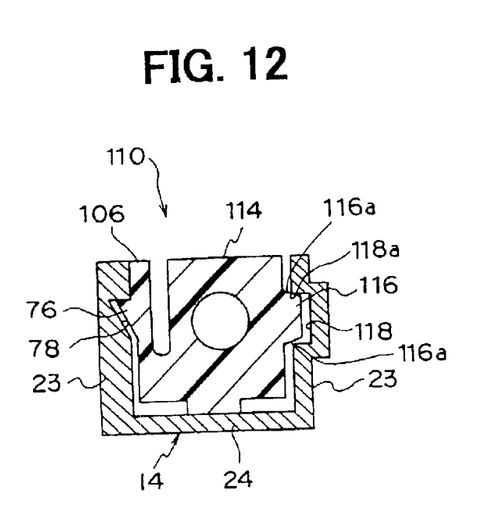
FIG. 12 is a cross-sectional view of a main part of a wiper arm according to the sixth embodiment of the present invention.

Referring to FIG. 12, in a wiper arm 110 of the sixth embodiment, a second washer nozzle 114, which is disposed at the distal end of the retainer 14, has the resilient piece 106 on one side and a projection 116 on the other side. The projection 116 has a truncated conical shape, so the cross-section of the projection 116, taken substantially perpendicular to the longitudinal direction of the retainer 14, is tapered. The projection 116 fits in a recessed portion 118 formed on one of the second side walls 23. Here, the first washer nozzle can have a structure similar to the second washer nozzle 114. Thus, description and illustration of the first washer nozzle are omitted.

In the wiper arm 110, advantages similar to those of the first embodiment can be obtained. In addition to the resilient piece 106 making contact with one of the second side walls 23 in the elastically pressing state, the projection 116 fits in the recessed portion 118 in such a manner that an opening edge 118a of the recessed portion 118 line contacts with a side surface 116a of the truncated cone-shaped projection 116. Therefore, similar to the wiper arm 100 of the fifth embodiment, it is possible to install the washer nozzle 114 without requiring additional parts. Accordingly, vibration of the washer nozzle 114 between the side walls can be prevented. Further, vibration of the washer nozzle 114 in the direction substantially perpendicular to the base wall 24 can be prevented.

(Seventh Embodiment)

Figure 13:
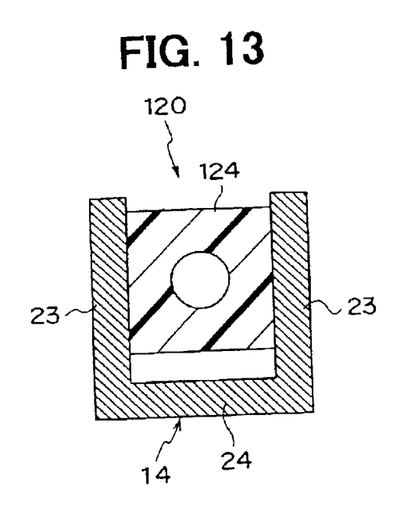
FIG. 13 is a cross-sectional view of a main part of a wiper arm according to the seventh embodiment of the present invention.

Referring to FIG. 13, in a wiper arm 120 of the seventh embodiment, a second washer nozzle 124 has a predetermined width and is installed between the second side wall 23 of the retainer 14 in such a manner that side walls of the washer nozzle 124 tightly contact the inner surfaces of the side walls 23. That is, the washer nozzle 124 is tightly fitted and held between the side walls 23. The first washer nozzle can have a structure similar to the second washer nozzle 124, so description and illustration of the first washer nozzle are omitted.

Also in the wiper arm 120, additional parts are not required to install and fix the first washer nozzle and the second washer nozzle 124 in the retainer 14. Since the washer nozzles are installed in the cavity of the retainer 14, outside appearance is enhanced. Further, it is possible to protect the washer nozzles from the external forces of snow, ice and the like.

Also, the first washer nozzle and the second washer nozzle 124 can have the first resilient part, similar to the first and second embodiments. Therefore, the installation of the washer nozzles is enhanced.

The present invention should not be limited to the disclosed embodiments, but may be implemented in other ways without departing from the spirit of the invention.

What is claimed is:

1. A wiper arm comprising:
   a longitudinal body having a longitudinal base wall, a pair of side walls extending from opposite longitudinal edge of the base wall, and a substantially U-shaped cross-section opening toward a wiping surface;
   a delivery pipe extending along the longitudinal body for delivering washer liquid; and
   a washer nozzle to which the delivery pipe is connected to spray the washer liquid on the wiping surface and being mounted between the pair of side walls, wherein the washer nozzle has a first engagement portion that is formed with one of a projection and a recessed portion and the pair of side walls has a second engagement portion that is formed with the other of the projection and the recessed portion, and wherein the first engagement portion and the second engagement portion interlock with each other, wherein the washer nozzle has a first resilient part that resiliently contacts the base wall.

2. The wiper arm according to claim 1, wherein the first and second engagement portions have a noncircular cross-sectional shape taken along a direction substantially parallel to a longitudinal direction of the pair of side walls, thereby restricting the washer nozzle from rotating with respect to the longitudinal body.

3. The wiper arm according to claim 1, wherein the projection has a tapered potion and line contacts with an edge of the recessed portion.

4. The wiper arm according to claim 1, wherein the first resilient part has a pair of resilient pieces extending in opposite directions to each other, which causes a force in opposing rotational directions about the engagement portions.

5. The wiper arm according to claim 1, wherein the washer nozzle has a second resilient part that resiliently contacts at least one of the side walls.

6. A wiper arm comprising:
   a longitudinal body having a longitudinal base wall, a pair of side walls extending from opposite longitudinal edges of the base wall, and a substantially U-shaped cross-section opening toward a wiping surface, wherein the longitudinal body has a folded portion that is provided by folding a portion of each side wall toward the base wall, thereby creating a first pair of side walls and a second pair of side walls in a longitudinal direction;
   a delivery pipe extending along the longitudinal body for delivering washer liquid;
   a first washer nozzle to which the delivery pipe is connected to spray washer liquid on the wiping surface, wherein:
      the first washer nozzle is mounted between one of the pairs of side walls;
      the first washer nozzle is positioned at a substantially intermediate portion of the longitudinal body;
      the first washer nozzle has a first engagement portion that is formed with one of a projection and a recessed portion and one of the pairs of side walls has a second engagement portion that is formed with the other of the other of the projection and the recessed portion; and
      the first engagement portion and the second engagement portion interlock with each other;
   a second washer nozzle, wherein the second washer nozzle is positioned at an end of the longitudinal body; and
   an arm piece, wherein an end of the arm piece is joined with the longitudinal body at the folded portion between the first pair of side walls and the second pair of side walls.

7. The wiper arm according to claim 6, wherein the first washer nozzle includes an inlet nipple from which the washer liquid is introduced into the first washer nozzle, an outlet nipple from which the washer liquid is communicated to the second washer nozzle, a communication pipe permitting communication between the inlet pipe and the outlet nipple, and a side pipe diverging from the communication pipe and providing a spray orifice at an end from which a portion of the washer liquid sprays toward the wiping surface.

8. The wiper arm according to claim 6, wherein the first washer nozzle is mounted between the first pair of side walls and the second washer nozzle is mounted between the second pair of side walls.

9. A wiper arm comprising:
   a longitudinal body having a longitudinal base wall, a pair of side walls extending from opposite longitudinal edges of the base wall and a substantially U-shaped cross-section opening toward a wiping surface;
   first and second delivery pipes extending along the longitudinal body or delivering washer liquid;
   a first washer nozzle to which the first delivery pipe is connected to spray the washer liquid toward the wiping surface;
   a second washer nozzle to which the second delivery pipe is connected to spray the washer liquid toward the wiping surface, wherein:
      the second washer nozzle is mounted at an end of the longitudinal body;
      the first washer nozzle is mounted on the longitudinal body apart from the second washer nozzle;

at least one of the first and second washer nozzles is tightly fitted between the pair of side walls; and the longitudinal body has a folded portion that is provided by folding a portion of each side wall toward the base wall, thereby creating a first pair of a side walls and a second pair of side walls in the longitudinal direction of the longitudinal body; and an arm piece, wherein an end of the arm piece is joined with the longitudinal body at the folded portion between the first and second pairs of side walls.

10. The wiper arm according to claim 9, wherein the first washer nozzle includes an inlet nipple from which the washer liquid is introduced into the first washer nozzle, an outlet nipple from which the washer liquid exits to the second washer nozzle, a communication pipe permitting fluid communication between the inlet nipple and the outlet nipple, a side pipe diverging from the communication pipe and proving a spray orifice at an end from which a portion of the washer liquid sprays toward the wiping surface.

11. The wiper arm according to claim 9, wherein the first washer nozzle is fitted between the first pair of side walls and the second washer nozzle is fitted between the second pair of side walls.

12. A wiper arm comprising:

a longitudinal body having a longitudinal base wall, a pair of side walls, extending from opposite longitudinal edges of the base wall and a substantially U-shaped cross-section opening toward a wiping surface;

first and second delivery pipes extending along the longitudinal body delivering washer liquid;

a first washer nozzle to which the first delivery pipe is connected to spray the washer liquid toward the wiping surface; and a second washer nozzle to which the second delivery pipe is connected to spray the washer liquid toward the wiping surface, wherein:

the second washer nozzle is mounted at an end of the longitudinal body;

the first washer nozzle is mounted on the longitudinal body apart from the second washer nozzle;

at least one of the first and second washer nozzles is tightly fitted between the pair of side walls; and at least one of tho first and second washer nozzles has a first resilient part that resiliently contacts the base wall.

* * * * *